United States Patent
Kron

(10) Patent No.: US 8,025,329 B1
(45) Date of Patent: Sep. 27, 2011

(54) COLLAPSIBLE AIRFOIL FOR TRUCKS AND TRAILERS

(76) Inventor: Steven Todd Kron, Pewaukee, WI (US)

( * ) Notice: Subject to any disclaimer, the term of this patent is extended or adjusted under 35 U.S.C. 154(b) by 0 days.

(21) Appl. No.: 12/787,424

(22) Filed: May 26, 2010

(51) Int. Cl.
*B62D 35/00* (2006.01)
(52) U.S. Cl. .................................. 296/180.4; 296/180.1
(58) Field of Classification Search ................ 296/180.1, 296/180.4
See application file for complete search history.

(56) References Cited

U.S. PATENT DOCUMENTS

| | | | |
|---|---|---|---|
| 4,006,932 A | 2/1977 | McDonald | |
| 4,458,936 A | 7/1984 | Mulholland | |
| 4,601,508 A | 7/1986 | Kerian | |
| 4,741,569 A | 5/1988 | Sutphen | |
| 4,818,015 A | 4/1989 | Scanlon | |
| 5,498,059 A | 3/1996 | Switlik | |
| 5,823,610 A | 10/1998 | Ryan | |
| 6,257,654 B1 | 7/2001 | Boivin | |
| 6,286,894 B1 | 9/2001 | Kingham | |
| 6,309,010 B1 * | 10/2001 | Whitten | 296/180.1 |
| 6,457,766 B1 | 10/2002 | Telnack | |
| 6,485,087 B1 | 11/2002 | Roberge | |
| 6,666,498 B1 | 12/2003 | Whitten | |
| 7,207,620 B2 | 4/2007 | Cosgrove | |
| 7,380,868 B2 | 6/2008 | Breidenbach | |
| 7,404,592 B2 | 7/2008 | Reiman | |
| 7,537,270 B2 | 5/2009 | O'Grady | |
| 7,618,086 B2 | 11/2009 | Bereidenbach | |
| 7,699,382 B2 | 4/2010 | Roush | |
| 7,845,708 B2 * | 12/2010 | Breidenbach | 296/180.4 |
| 7,857,376 B2 * | 12/2010 | Breidenbach | 296/180.1 |

* cited by examiner

*Primary Examiner* — Lori Lyjak
(74) *Attorney, Agent, or Firm* — Absolute Technology Law Group, LLC

(57) ABSTRACT

The purpose of the device is to minimize drag and turbulence otherwise occurring at the rear of a semi trailer, in order to reduced the consumption of fuel by a semi tractor. This is accomplished using directionally flexible sheets of composite material, which create contours that taper towards a terminating edge to form a teardrop shape, as established by panels attached to the top and bottom of either door. Along the trailing edge of the main body, another vertical panel known as a wake separator maintains separation between confliction columns of air. An additional wake separator attached to the bottom of the device performs a similar function, and will facilitate collapse in the event of a collision.

11 Claims, 5 Drawing Sheets

COLLAPSIBLE AIRFOIL FOR TRUCKS AND TRAILERS

BACKGROUND OF THE INVENTION

1. Field of the Invention

Of the factors impacting the fuel economy of trucks, tractor-trailers, and other long haul vehicles, it is their aerodynamic efficiency that is, at present, most possible to improve. While tractors are relatively aerodynamic, trailers must assume the form of a box, which, other than those devices intended to intake or inhibit the flow of air, represents the least aerodynamic design. The tractor-trailer is subject to substantial drag as a result of the abrupt termination of the trailer walls at its aft, which creates a partial vacuum and causes turbulent airflow. Ideally speaking, the contour of the trailer and its influenced airflow would taper to a single point or terminating edge, as in a teardrop shape.

In spite of this flaw, the rectangular shape of a box is the only sensible design, as a trailer with an aerodynamic contour will reduce the volume of interior cargo space. It is impossible to compensate for this reduction by increasing the overall length of the trailer, which cannot exceed 53' because of legal restrictions and practical limitations. Furthermore, any modifications to the primitive shape of an ordinary trailer that cut away insignificant portions of its cargo space would have little impact with regard to its aerodynamic efficiency.

Consequently, an additional apparatus attached to the rear of the trailer is the only means of achieving an aerodynamic form. While the standard trailer is limited to 53' the federal government allows aerodynamic attachments an exclusion from normal length and width determinations. According to §658.16 of the Federal Motor Carrier Safety Administration regulations: "Aerodynamic devices that extend a maximum of 5 feet beyond the rear of the vehicle, provided such devices have neither the strength, rigidity nor mass to damage a vehicle, or injure a passenger in a vehicle, that strikes a trailer so equipped from the rear, and provided also that they do not obscure tail lamps, turn signals, marker lamps, identification lamps, or any other required safety devices, such as hazardous materials placards or conspicuity markings."

The collapsed size of an attachment, although not subject to a particular statutory restriction, is equally important to consider. The trailer doors to which an aerodynamic apparatus is affixed have been designed to open all the way back to the sidewalls, fitting flat against the trailer to facilitate docking. When flattened, folded, or deflated, any such apparatus must be small enough to fit within the narrow space normally existing between the trailer and its doors. While a wide variety of devices would allow limited use of the doors, only a handful of designs can completely satisfy this condition.

2. Description of the Prior Art

As the most aerodynamic apparatus would assume the tapered contour of the teardop, it is probable that a percentage of prior art should fit this basic profile. None of these designs, however, satisfy the necessary conditions of a working device. For example, the 'vehicle drag reducer' of U.S. Pat. No. 4,257,641 shares a similar shape, but this is achieved by replacing the standard doors instead of by mounting an additional apparatus. Not only would this design increase the length of the trailer without increasing cargo capacity, but such curved doors could not close completely, prohibiting temperature control or other advantages associated with conventional cargo containers.

The 'reduced drag trailer' of U.S. Pat. No. 6,286,894 and 'trailer with aerodynamic rear door' of U.S. Pat. No. 7,699,382 B2, are subject to similar flaws. These devices could not easily be retrofitted to an existing cargo container. On account of the problems associated with major modifications to the main body of a trailer, the majority of patents in the field of this invention propose the addition of an attached apparatus.

While the drag reducing fairing of U.S. Pat. No. 4,458,936 exhibits a shape similar to the present invention, its construction is completely different and its use ultimately impractical. Proposed to be produced from rigid lightweight plastics or metal skin, this attached apparatus is a solid structure and as such could not be collapsed or otherwise undeployed. While it is suggested that this rear fairing could be readily detached, this process would prove impractical, particularly as removal need be regularly performed. Not only would such a device be rigid and uncollapsible, but with a volume as large as 150 cubic feet, its dimensions would make it unmanageable. Since the removal and replacement of any such fairing would be inordinately complicated and time consuming, this type of device must remain attached. As trailer doors are regularly opened and closed, an attached apparatus should be constructed such that it can be collapsed or deployed at will.

A percentage of prior art is designed with this requirement chiefly in mind, but consequently lacks the preferred contour present in other aerodynamic apparatuses. Instead, these devices consist of flat panels extending from the top, bottom, and sidewalls of the trailer, as in the 'apparatus for reducing drag' of U.S. Pat. No. 5,498,059 or 'air drag reducing apparatus' of U.S. Pat. No. 6,485,087 B1 and U.S. Pat. No. 6,257,654 B1. Whether deployed or collapsed, these panels are always flat, and as such cannot form the preferred contour. While such a shape is easily folded to fit with the door, these panels merely modify the existing shape of the trailer rather than transform it. Such a configuration is insufficient to eliminate the partial vacuum present at the rear of the trailer during transit or its deleterious effects on fuel economy.

Paneled construction could be used to create curved contours, as in the 'deployable airfoil' of U.S. Pat. No. 6,666,498. While this configuration creates a more aerodynamic contour than similar devices, it suffers from a fatal flaw. Namely, it is dependent upon panels with a preexisting and persistent curved shape, meaning that they can never fold flat against the doors such that they may be opened completely, which is to say folded against the sides of the trailer, a necessary condition for docking at nearly every facility freight is delivered. The difficulty of docking is compounded by a related deficiency, that these panels could not be folded back onto themselves and as a result extend beyond the length of the swing doors, making their opening and closing cumbersome or hazardous.

The desired shape could also be achieved through the use of air bladders, as in the 'inflatable drag reducer' of U.S. Pat. No. 4,741,569, the 'drag reducing apparatus' of U.S. Pat. No. 5,823,610 and the 'vehicle streamlining structure' of U.S. Pat. No. 6,457,766, but their assembly lacks significant support structures. Due to their insubstantial construction, these devices would be unstable under the highway conditions at which they would otherwise yield their greatest benefit. In such a scenario, an inflatable device is subject not only to aerodynamic turbulence but strong crosswinds that would further destabilize its form and undermine its aerodynamic efficiency. Furthermore, suggested methods for ducting air to the rear of the trailer, in order to sustain the shape of such a device or perform an auxiliary function, are either too complex or compromise its main purpose, which is to reduce drag.

Those devices that collapse rather than deflate are also fraught with difficulties. Many proposed devices would inhibit or prevent outright the normal operation of trailer doors. The 'aerodynamic drag reducing apparatus' of U.S.

Pat. No. 7,380,868 consists of nested frames that could be extended to create a tapered form. Even when retracted, these frames would restrict the motion of the doors by as much as one third. As the collapsed depth of the device along the edge nearest the hinge must be as little as one inch, this imposes insurmountable limitations to the size of these nested frames. Related U.S. Pat. No. 7,618,086 improves upon its predecessor, but would nevertheless restrict use of the doors. While the accordion type apparatus is more compact, it would even in its collapsed stated prevent the doors from folding flat against the trailer.

As the full range of motion associated with normal use of the trailer doors is necessary for docking, any device which fails to satisfy this requirement is impractical to use and pointless to produce.

SUMMARY OF THE INVENTION

The purpose of the device is to minimize drag and turbulence occurring at the rear of a semi trailer, in order to reduced the consumption of fuel by a semi tractor. This is accomplished using directionally flexible panels consisting of composite material, which are hinged on either side of the trailer via the existing door hinges. These main panels form a contour ending in a wedge at the rear of the device, a shape established by additional panels hinged on the top and bottom of either door, and reinforced by the pressure these additional panels exert against the main body of the device.

The basic form of the device is such that it fits the full profile of the trailer doors, then tapers inward towards a terminating edge. These contours, as defined by the top and bottom panels through the pressure they exert against the vertical panels, create a teardrop shape, as viewed from the dorsal or ventral perspective. This teardrop shape minimizes the effect of the wake created by the void present behind a moving trailer, causing air to flow smoothly towards the center and effectively eliminating any such vacuum.

As a result of this tapered contour, airflow converges at the trailing edge of the device. Since the collision of air volumes flowing from either side of the device would cause continued turbulence, this airflow is separated by another panel fastened to the end of the main body via a hinge. This additional panel, referred to as the wake separator, extends along the edge at which left and right sections of the device are joined during deployment, in order to maintain separation between conflicting columns of air from either side of the trailer. An additional wake separator attached to the bottom of the device performs a similar function, but will also facilitate collapse in the event of a rear end collision.

DETAILED DESCRIPTION OF THE PREFERRED EMBODIMENT

Figure 4:
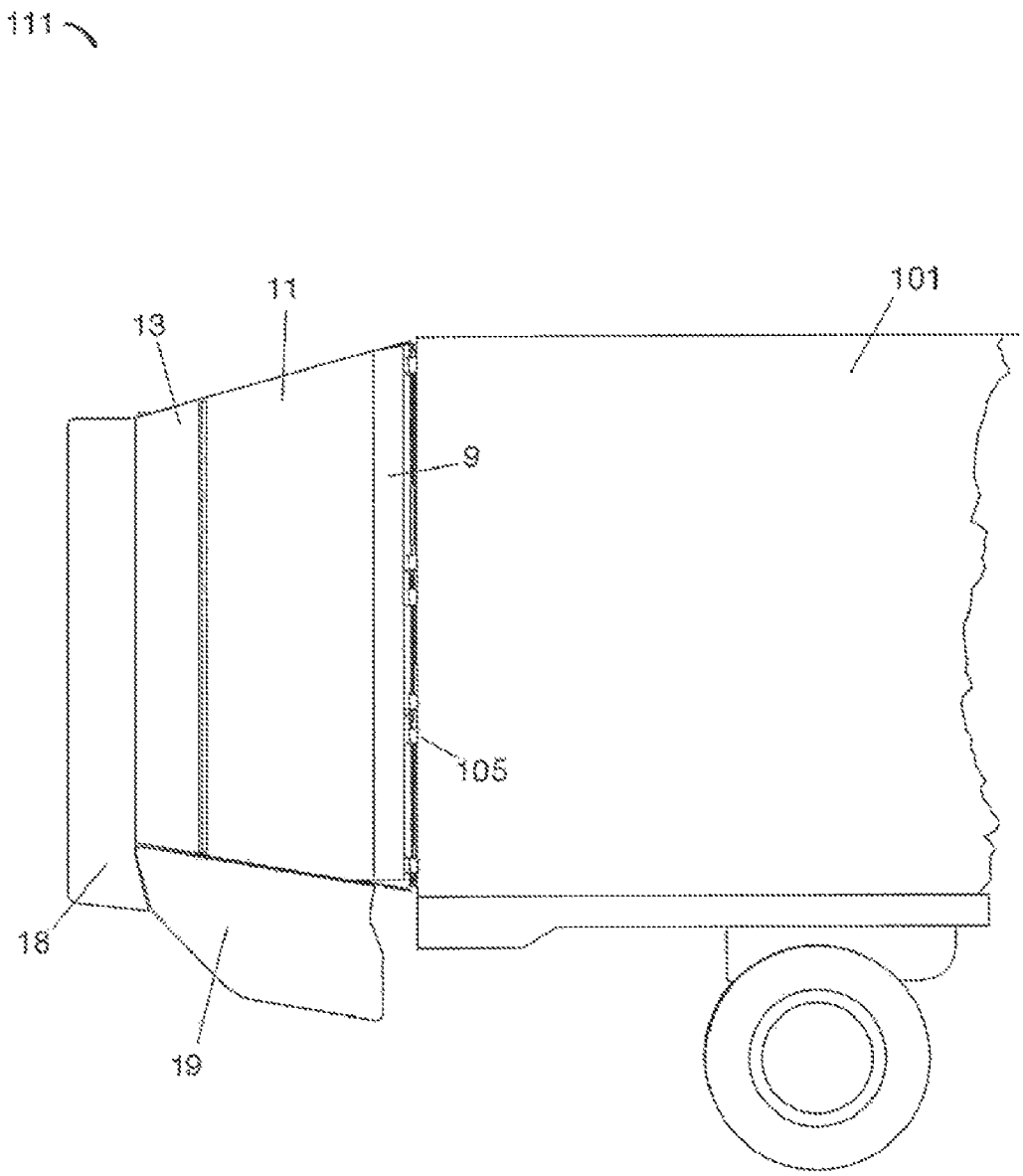
FIG. 4. is a side view of the folding airfoil 111 in its deployed configuration.

The tapered contour and teardrop shape of the present invention is formed by sheets of directionally flexible composite material, which are hinged on either side of the trailer via the existing door hinges. These primary panels form a contour ending in a wedge at the rear of the device, a shape established by other sheets hinged to the top and bottom of either door. The vertical sections consist of two distinct sheets, one hinged to the trailer 10 & 11 and the other to the end of the first section 12 & 13. They may be folded flat against the door along the axis of these sets of hinges as in FIG. 2. Their segmentation enables length sufficient for the panels to meet a full 4' behind the trailer, but prevents them from extending beyond the center of the trailer when folded flat against the doors. When deployed, these panels 10, 11, 12 & 13 form a curved contour, as imposed by separate sheets hinged along the top 14 & 15 and bottom 16 & 17 of the trailer as in FIG. 4.

The primary vertical panels 10 & 11 are not hinged directly to the door, but are attached to aluminum plates 08 & 09 that extend along the height of the trailer doors. This is advantageous as the composite sheets 10 & 11 composing these panels are produced with 4' width, and attaching them to this aluminum fixture allows such sheets to span the full height of the device. Furthermore, this secure assembly supplies additional support to these sheets, giving strength and security to components nearest the vehicle without limiting flexibility at the rear of the device. While these elements are attached via the existing door hinges 104 & 105 in order to minimize modification to the trailer, the device hinges might also originate from the edge of the trailer, on separate mounts. This mode of assembly could reduce the gap between the vertical panels and the end of the trailer in addition to facilitating a more universal design that would accommodate most if not all trailers.

While the vertical panels 10, 11, 12 & 13 constitute the bulk of the device, they are on their own without form, folding flat in the absence of applied pressure. The shape of the device is determined by a further four sheets of the same composite material, with one attached to the top and bottom of both doors. Attached to the uppermost and lowermost part of the doors via piano hinges, these sheets support the shape of the structure by supplying outward pressure when the components of the device are drawn together. As the top panels 14 & 15 are raised into position with cables, cords, rope, or other line, the sides 10, 11, 12 & 13 are simultaneously pulled into place against them. When these components are latched into place, they form a stable structure, with a shape supplied by the top 14 & 15 and bottom 16 & 17 panels and the pressure they exert on the otherwise flat vertical panels.

As the top panels 14 & 15 are made from the same directionally flexible sheets as are the primary side panels, it must be reinforced with an aluminum angle 34 & 35. Affixed to the underside of the sheet, this aluminum angle helps these sheets support the structure and enables them to better bear the weight of what snow they do not shed. The top panels 14 & 15 are supplied with additional stability by metal angles placed along the top edge of the vertical sheets. As these angle inward, they preside over the top panels, preventing them from popping out and allowing them to rest against the main body, which offers additional weight bearing capability.

It is important that the top and bottom of the airfoil 111 consist of separate panels, one on either door, as they can be folded down when the doors open. The configuration also allows either side of the device to be deployed independently of the other, enabling the driver to survey the inside of the trailer while one half of the device remains deployed.

The basic form of the airfoil 111 is such that it fits the full profile of the trailer doors, then tapers inward towards a terminating edge. These contours, as defined by the top and bottom panels through the pressure they exert against the vertical panels, create a teardrop shape, as viewed from the dorsal or ventral perspective. This teardrop shape minimizes the effect of the wake created by the void present behind a moving trailer, causing air to flow smoothly towards the center and effectively eliminating any such vacuum.

As a result of this tapered contour, airflow converges at the trailing edge of the device. Since the collision of air volumes flowing from either side of the device would cause continued turbulence, this airflow is separated by another panel fastened to the end of the main body via a hinge. This additional panel, termed the wake separator 18, extends vertically, along the edge at which left and right of the device are joined. The wake separator extends from the trailing edge of the device, reaching back 1' and bringing the total length of the device to 5' from the rear of the trailer.

Figure 1:
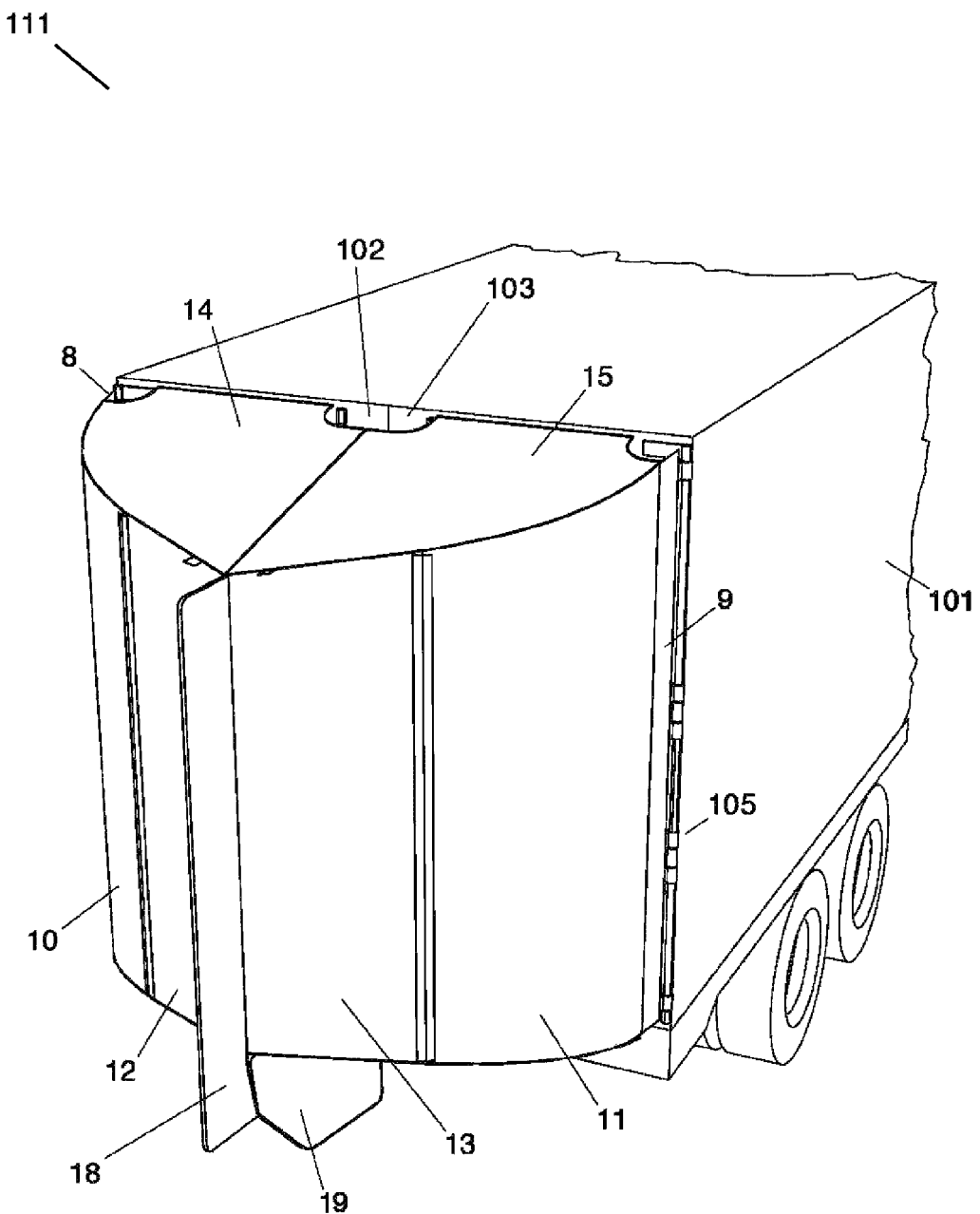
FIG. 1. is a view of a tractor 100 and trailer 101 with attached folding airfoil 111. The attached aerodynamic device is shown in its deployed configuration.
Figure 2:
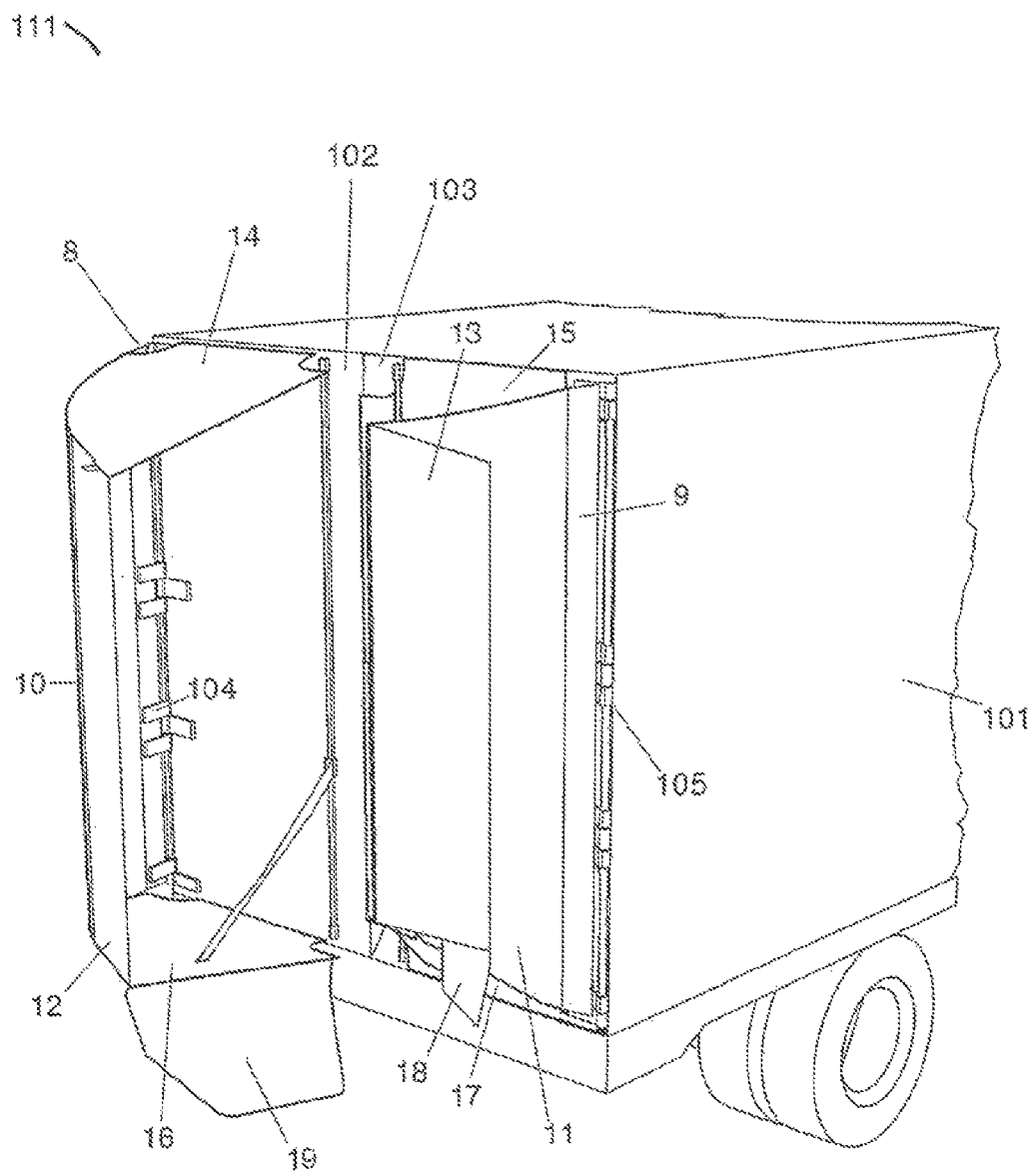
FIG. 2. is a view of the folding airfoil with collapsed right side. With this section undeployed, it can be folded against the door 103.
Figure 3A:
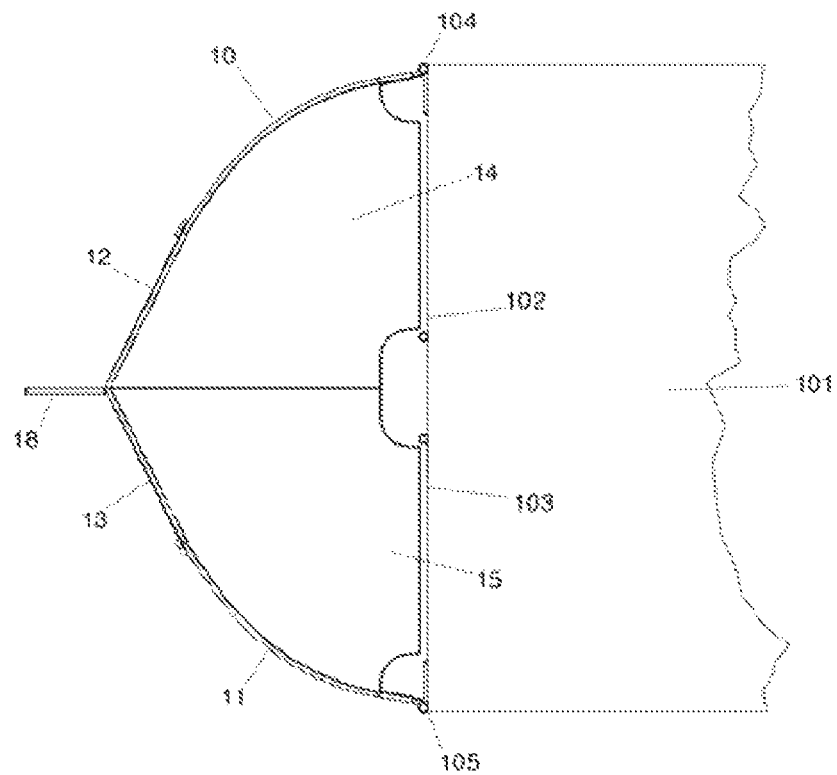
FIG. 3a. is a top view of the folding airfoil 111 as it would appear fully deployed.
Figure 3B:
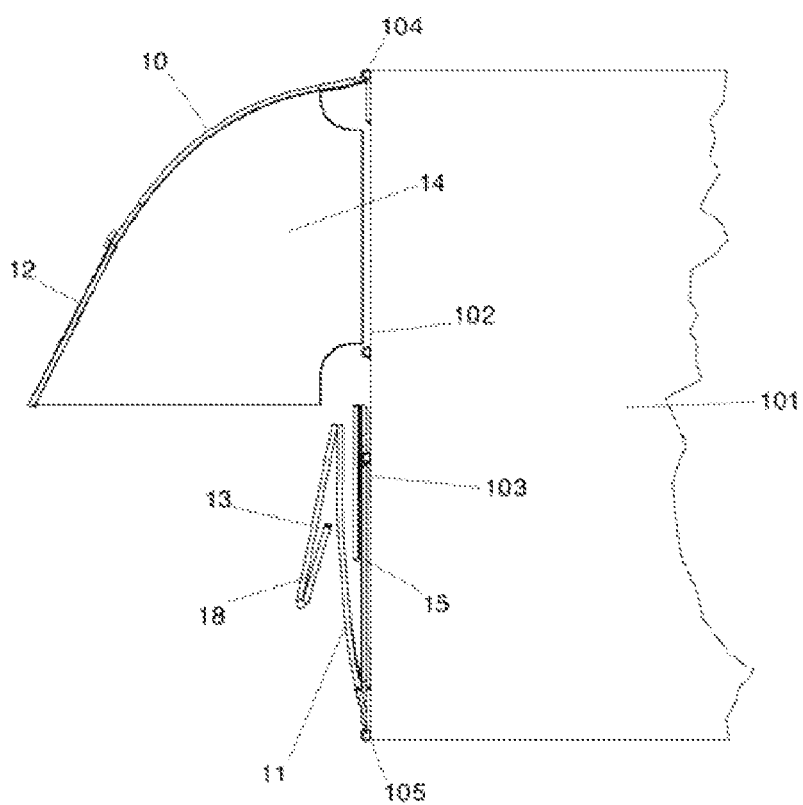
FIG. 3b. is a top view of the folding airfoil as it would appear with the panels 11 & 13 that constitute its right half collapsed towards the door.
Figure 5:
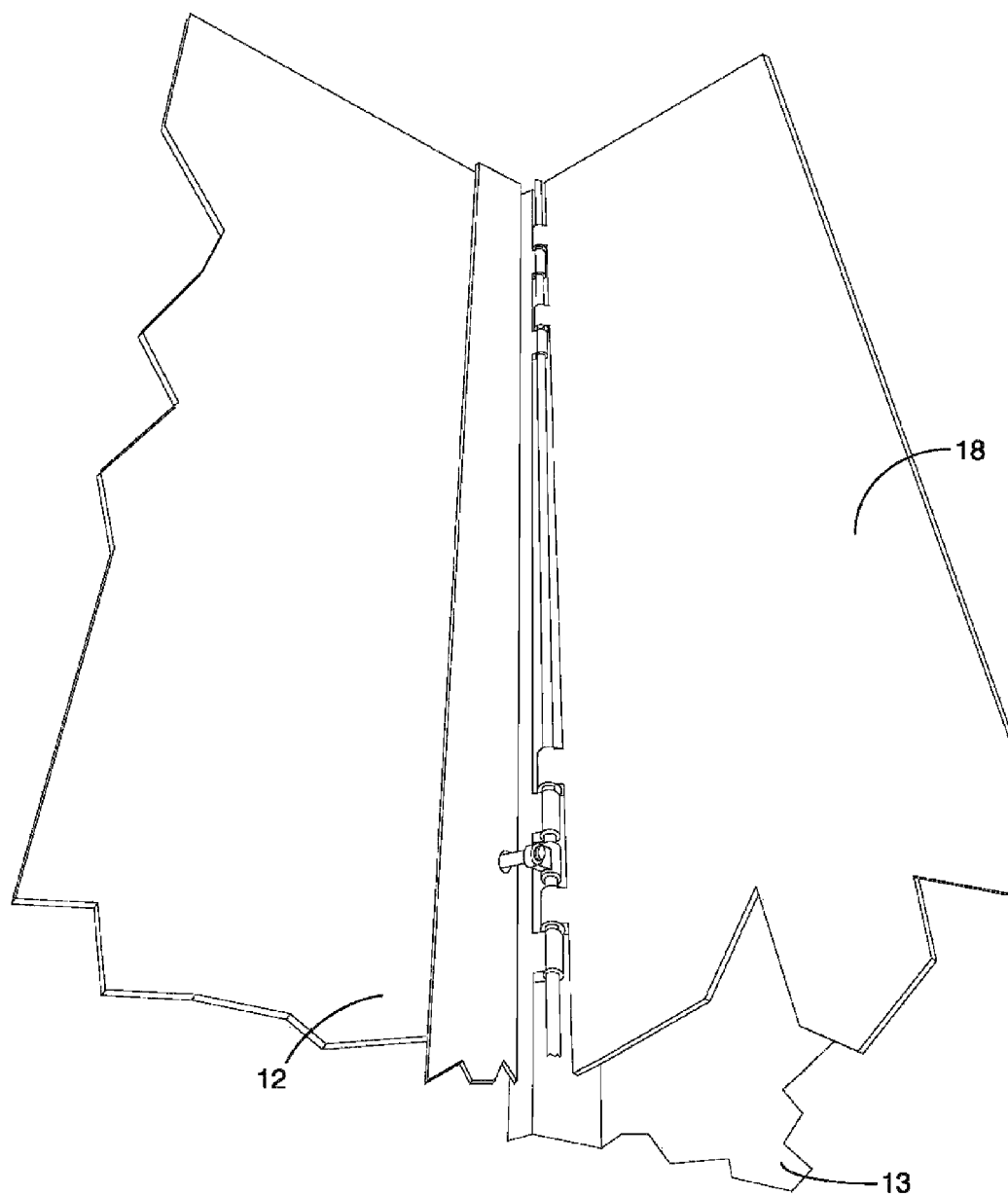
FIG. 5. is an upward view of the wake separator 18, illustrating the hinge mechanism 28 by which it is attached and that latches the separate sides of the device together.

As the wake separator 18 is hinged to one of the side panels, it can also be folded flat against the door as in FIG. 2, and does not add to its combined length or width of the device when retracted. When the wake separator is deployed, it extends parallel to the length of the trailer and fastens together the left and right sides of the device, as the latching mechanism and wake separator use the same hinge assembly as in FIG. 5.

The wake separator 18 keeps currents of air on either side of the device from abrupt and uncontrolled collision, keeping the wake eddies small and organized. The prior art that consists of wakeboards extending directly back and ending abruptly solves only one aspect of this aerodynamic problem. Namely, this other device splits up the eddy pools, but retains the least desirable quality of the unmodified trailer, the significant void immediately behind, which inevitably results in high levels of turbulence.

Some prior art consists of a closed and continuous shape, with connected left and right sections, but use fabric or curved panels, a distinctly disadvantageous composition in the context of actual use. While fabric tends to ripple and flex, rigid contours will prevent the swing doors 102 & 103 from opening completely. In this case, however, the panels are stable and sturdy, but form a curved shape only when deployed, and may otherwise fold flat against the doors. Furthermore, these panels form a wedge supplemented by a wake separator 18, features entirely unique to this particular device.

The present invention has a total length of 5', extending to the full legal limit, which is longer than that achieved by prior art. In spite of this length, the curved profile of the device means that is less likely to collide with other objects, as compared to prior art. While prior art might extend as much as 4' nearly straight back, this device reaches its full length only in the middle, making a collision with any other objects significantly less likely, as in cases where the trailer swings wide during turns.

A percentage of prior art violates the crucial qualifications of the exclusions from length and width determinations, as it has the strength and rigidity to damage a vehicle or injure a passenger. The present invention, however, is constructed from directionally flexible composite material, which gains stability exclusively through the virtue of its assembly. This device is not braced or supported by a rigid framework, so it is unlikely to cause injury in the event of a collision. Indeed, a collision with the device would be preferable to a direct impact with the rear of the trailer.

The present invention is designed to account for such a scenario. To that end, an additional panel 19 is attached to the wake separator 18, hinged at the end of the right assembly, and attached to its bottom panel 17. When this lower wake separator is swung down into position, it rests in line with the main wake separator, but curves down to approximately 3' below the main body of the device. In case of collision, it would force the bottom panels 16 & 17 upward, causing the main body to collapse, which would minimize damage to vessels coinciding with the rear of the trailer. It also serves an aerodynamic function, separating the turbulence originating from the underside of the trailer and reduce resulting eddy pools below the main body of the device.

In its earliest designs, this device assumed a dramatically different form, which would ultimately prove to be wholly unworkable. I theorized that air bladders could be used to support a plurality of fiberglass strips that would give shape to a canvas covering. Even at the earliest stages of developing a prototype, it was obvious that such a design would not satisfy the basic requirements of an aerodynamic device for trucks and trailers with swing doors. While the air bladders would collapse such that these doors could be opened completely, the additional elements necessary for establishing an aerodynamic shape would increase the collapsed thickness of the device beyond what would fit between the trailer and doors when they are fully folded back. Furthermore, the shape of the device would be strictly limited by what could be supported through this relatively insubstantial framework.

In light of these limitations, I was forced to scrap my original plans, but the search for suitable materials revealed a more practical approach. Directionally flexible composite sheets could be used instead of canvas to compose the contours of the main body. Folding brackets supplied these composite sheets with strength and structure, establishing the radius of their curved contour and collapsing when necessary.

While an eight month testing phase promised potential success, it also revealed a variety of flaws native to the original design, which necessitated a complete overhaul of the device. The present invention extends to 5' behind the back of the trailer, exactly the legal limit, while the earlier incarnation reached a length of only 3'. As a result, the main body of the original device lacked the extended taper of the new version and ended in a plane parallel to the trailer doors.

While shape of the present invention is achieved by pulling the main panels on either side against additional panels attached to the top and bottom of the doors, the first incarnation had side panels only and collapsible braces were required to define the shape. These braces enabled easy deployment and collapse, but posed a number of problems. Most notably, their presence prohibited the inclusion of top and bottom panels, leaving a space to be spanned instead spanned by sheets of canvas. This relatively insubstantial material was difficult to work with, collected snow, and ultimately proved less durable than is required for frequent and extended use. Furthermore, the braces that imposed the structure of this early prototype might be too strong in the event of a rear end collision, which would not necessarily generate force sufficient to their collapse, except in cases where force is applied normal to the axis of the brace itself.

The present invention is also symmetrical, a feat accomplished by making both sides longer than the width of each door. In the first generation device, the length of the left side panel was greater than that of the door, but its unsegmented construction meant that it extended beyond the length of the door when collapsed. While this extra length was necessary to unite it with the other side, it could under certain circumstances obstruct the opening of the doors, as when they must be swung all the way to the side. In the present invention, each half consists of two separate segments, allowing them to be folded flat without extending beyond the perimeter of the door.

This extensive testing period yielded a working prototype that exceeds the proposals of prior art. The design of the present invention has been determined by the constraints of constructing a working prototype, informed by practice as well as theory.

I claim:

1. A collapsible airfoil for trucks and trailers comprised of:
   a first directionally flexible vertical panel having a inner edge and an outer edge, said inner edge being pivotally attached to a first trailer door and said outer edge being pivotally attached to a hinged component;
   a second directionally flexible vertical panel having an inner edge and an outer edge pivotally attached to said first vertical flexible panel by said hinged component;
   a third directionally flexible vertical panel having a inner edge and an outer edge, said inner edge being pivotally attached to a second trailer door and said outer edge being pivotally attached to a hinged component;
   a fourth directionally flexible vertical panel having an inner edge and an outer edge pivotally attached to said third vertical flexible panel by said hinged component;
   a first upper semi-rigid horizontal panel having an upper surface and a lower surface, said first upper semi-rigid horizontal panel pivotally attached to said first trailer door supported at in inward angle $\alpha$, said angle $\alpha$ having a range of 15-30 degrees defined by the upper edge of the vertical doors;
   a second upper semi-rigid horizontal panel pivotally having an upper surface and a lower surface, said second upper semi-rigid horizontal panel attached to said second trailer door supported at in inward angle $\alpha$, said angle $\alpha$ having a range of 15-30 degrees defined by the upper edge of the vertical doors;
   a first lower semi-rigid horizontal panel having an upper surface and a lower surface, said first lower semi-rigid horizontal panel pivotally attached to said first trailer door supported at an inward angle;
   a second lower semi-rigid horizontal panel having an upper surface and a lower surface, said second lower semi-rigid horizontal panel pivotally attached to said second trailer door supported at an inward angle;
   a plurality of brackets to prevent said first horizontal panel and said second horizontal panel from being blown upward;
   a first pull cable attached to an aperture in said outer edge of said second directionally flexible vertical panel to close panels;
   a second pull cable attached to an aperture in said outer edge of said fourth directionally flexible vertical panel to close panels;
   a first support cable attached to said upper surface of said first upper semi-rigid horizontal panel and secured to said first trailer door at an angle of 30-50 degrees;
   a second support cable attached to said upper surface of said second upper semi-rigid horizontal panel and secured to said second trailer door at an angle of 30-50 degrees;
   said first, second, third and fourth vertical panels forming a tear drop shape when engaged by said pull cables and said support cables;
   a central wake separating panel pivotally attached to the outer side edge of said first flexible vertical panel; and
   a second wake separating panel releasably attached to said first lower semi-rigid horizontal panel.

2. The collapsible airfoil for trucks and trailers of claim 1 wherein said central wake separating panel has a substantially rectangular shape having a width of at least 1 foot.

3. The collapsible airfoil for trucks and trailers of claim 1 wherein the top and bottom edges of said vertical panels are curved at a radius of curvature corresponding to that at which said horizontal panels are positioned and within a distance of four feet from the back of the trailer.

4. The collapsible airfoil for trucks and trailers of claim 1 wherein the top and bottom edges of said vertical panels are curved at a radius of curvature corresponding to that at which said horizontal panels are positioned.

5. The collapsible airfoil for trucks and trailers of claim 1 wherein said tension arc corresponds to the shape of the horizontal panel.

6. The collapsible airfoil for trucks and trailers of claim 1 wherein said tension arc corresponds to the angle of placement of said horizontal panels.

7. The collapsible airfoil for trucks and trailers of claim 1 wherein said support cables determine the angle of placement of said horizontal panels.

8. The collapsible airfoil for trucks and trailers of claim 1 wherein said outer vertical panels are tapered at an angle of 9-30 degrees, said angle corresponding to the angle at which said horizontal panels are positioned.

9. The collapsible airfoil for trucks and trailers of claim 1 wherein said lower second wake separator is substantially perpendicular to said lower horizontal panels.

10. The collapsible airfoil for trucks and trailers of claim 1 wherein said vertical panels are substantially curved at a radius of at least 4 feet when under arc tension.

11. The collapsible airfoil for trucks and trailers of claim 1 which further includes a third wake separating panel releasably attached to said second lower semi-rigid horizontal panel.

* * * * *